US010201788B2

(12) United States Patent
Hiramatsu et al.

(10) Patent No.: US 10,201,788 B2
(45) Date of Patent: Feb. 12, 2019

(54) POLYMER FLOCCULANT MIXING AND DISSOLVING SYSTEM CONFIGURED TO CONTROL PRESSURE ON DISCHARGE SIDE OF REGENERATIVE MIXER AND METHOD THEREOF

(71) Applicant: TOMOE ENGINEERING CO., LTD, Tokyo (JP)

(72) Inventors: Tatsuo Hiramatsu, Shinagawa-ku (JP); Yoshihiro Teruya, Kawasaki (JP)

(73) Assignee: TOMOE ENGINEERING CO., LTD, Tokyo (JP)

(*) Notice: Subject to any disclaimer, the term of this patent is extended or adjusted under 35 U.S.C. 154(b) by 0 days.

(21) Appl. No.: 15/542,877

(22) PCT Filed: Jan. 13, 2016

(86) PCT No.: PCT/JP2016/050773
§ 371 (c)(1),
(2) Date: Jul. 11, 2017

(87) PCT Pub. No.: WO2016/114283
PCT Pub. Date: Jul. 21, 2016

(65) Prior Publication Data

US 2018/0071699 A1 Mar. 15, 2018

(30) Foreign Application Priority Data

Jan. 14, 2015 (JP) ................................ 2015-005439

(51) Int. Cl.
*B01F 15/00* (2006.01)
*B01F 15/02* (2006.01)
(Continued)

(52) U.S. Cl.
CPC .......... *B01F 7/00466* (2013.01); *B01D 21/01* (2013.01); *B01D 21/30* (2013.01);
(Continued)

(58) Field of Classification Search
CPC ........... B01F 7/00466; B01F 15/00357; B01F 13/1016; B01F 15/00389; B01F 13/1025;
(Continued)

(56) References Cited

U.S. PATENT DOCUMENTS 5,344,619 A * 9/1994 Larwick .................... B01F 1/00
366/163.2
5,372,421 A * 12/1994 Pardikes ................. B01F 3/088
137/7

(Continued)

FOREIGN PATENT DOCUMENTS

JP S40007917 3/1965
JP H06086987 A 3/1994

(Continued)

OTHER PUBLICATIONS

International Search Report dated Feb. 9, 2016, mailed in counterpart International Application No. PCT/JP2016/050773, 2 pages.

*Primary Examiner* — Charles Cooley
(74) *Attorney, Agent, or Firm* — Patterson + Sheridan, LLP

(57) ABSTRACT

A mixing and dissolving system includes a tank where a polymer flocculant in a solid state is mixed with water, a liquid feed unit for feeding an aqueous solution containing the mixed polymer flocculant from the tank, one regenerative mixer comprising a casing arranged at an intermediate position of a channel for the aqueous solution discharged from the liquid feed unit, and a bladed wheel where grooves are formed in a radial pattern on an outer circumference, and is used to mix and dissolve the polymer flocculant through pressure application by rotating the bladed wheel in the casing and forming a vortex flow of the aqueous solution along an inner circumferential wall of the casing, and an adjusting unit arranged at an intermediate position of a
(Continued)

channel for the aqueous solution that has passed through the regenerative mixer, and controls pressure on a discharge side of the regenerative mixer.

6 Claims, 4 Drawing Sheets

(51) Int. Cl.

| | |
|---|---|
| ***B01F 7/00*** | (2006.01) |
| ***B01F 3/12*** | (2006.01) |
| ***B01F 5/12*** | (2006.01) |
| ***C02F 1/00*** | (2006.01) |
| ***C02F 1/52*** | (2006.01) |
| ***C02F 1/56*** | (2006.01) |
| ***B01D 21/01*** | (2006.01) |
| ***B01D 21/30*** | (2006.01) |
| ***B01F 13/10*** | (2006.01) |
| ***C02F 11/12*** | (2006.01) |
| ***C02F 11/14*** | (2006.01) |

(52) U.S. Cl.
CPC .......... *B01F 3/1221* (2013.01); *B01F 3/1228* (2013.01); *B01F 3/1271* (2013.01); *B01F 5/12* (2013.01); *B01F 13/1016* (2013.01); *B01F 13/1025* (2013.01); *B01F 15/00162* (2013.01); *B01F 15/00201* (2013.01); *B01F 15/00357* (2013.01); *B01F 15/00389* (2013.01); *B01F 15/0235* (2013.01); *C02F 1/001* (2013.01); *C02F 1/5227* (2013.01); *C02F 1/56* (2013.01); *C02F 11/127* (2013.01); *C02F 11/14* (2013.01); *B01F 2215/0052* (2013.01); *C02F 2001/007* (2013.01)

(58) Field of Classification Search
CPC .............. B01F 15/00201; B01F 3/1221; B01F 15/0235; B01F 2215/0052; B01F 15/00162; C02F 1/56; C02F 11/127; C02F 11/14; C02F 1/5227; C02F 1/001; C02F 2001/007
See application file for complete search history.

(56) References Cited

U.S. PATENT DOCUMENTS

| | | | | |
|---|---|---|---|---|
| 5,407,975 | A | 4/1995 | Pardikes | |
| 9,771,512 | B2 * | 9/2017 | Lucas | C09K 8/70 |
| 2002/0130086 | A1 | 9/2002 | Miura | |
| 2008/0053916 | A1 | 3/2008 | Taki et al. | |
| 2017/0137701 | A1 * | 5/2017 | Lucas | C09K 8/70 |
| 2018/0071699 | A1 * | 3/2018 | Hiramatsu | B01F 7/00466 |
| 2018/0117551 | A1 * | 5/2018 | Tamura | B01F 15/00389 |
| 2018/0264420 | A1 * | 9/2018 | Snuffin | B01F 3/1221 |

FOREIGN PATENT DOCUMENTS

| | | | | |
|---|---|---|---|---|
| JP | H10176064 | A | 6/1998 | |
| JP | 2001026650 | A | 1/2001 | |
| JP | 3184729 | B2 | 7/2001 | |
| JP | 3184797 | B2 | 7/2001 | |
| JP | 2011183314 | A | 9/2011 | |
| JP | 2013215733 | A | 10/2013 | |
| JP | 5521272 | B2 | 6/2014 | |
| WO | WO-2005077848 | A1 * | 8/2005 | B01D 33/15 |
| WO | 2007119720 | A1 | 10/2007 | |
| WO | 2010050416 | A1 | 5/2010 | |

* cited by examiner (a)

(b)

(c)

POLYMER FLOCCULANT MIXING AND DISSOLVING SYSTEM CONFIGURED TO CONTROL PRESSURE ON DISCHARGE SIDE OF REGENERATIVE MIXER AND METHOD THEREOF

TECHNICAL FIELD

The present invention relates to a polymer flocculant mixing and dissolving system and a method for mixing and dissolving a polymer flocculant that can produce a polymer flocculant solution in a short period of time using low power, and particularly to a technique for dissolving a solid polymer flocculant in water as a solvent.

BACKGROUND ART

In the field of sludge disposal, sludge concentration processing and sludge dehydration processing are performed. At this time, processing for adding a flocculant and flocculating sludge is performed in order to improve sludge concentration efficiency and sludge dehydration efficiency. In the field of water treatment, processing for flocculating and precipitating suspended substances is performed. Also, at this time, processing for adding a flocculant to water to be treated and flocculating suspended substances is performed in order to improve the efficiency of flocculation and precipitation.

In the above-described sludge disposal and water treatment, various flocculants such as an inorganic flocculant, a cationic polymer flocculant, and an anionic polymer flocculant are used selectively. Of these flocculants, solid polymer flocculants have the drawback of being poorly soluble in a liquid while exhibiting a high flocculation effect due to cross-linking flocculation. Therefore, solid polymer flocculants are not added directly to sludge or the like, but are dissolved in water in advance to form an aqueous solution and then added to sludge or the like such that a predetermined chemical injection rate is achieved.

However, the polymer flocculants have another problem in that, if a long period of time passes after an aqueous solution of the polymer flocculant has been prepared, the aqueous solution deteriorates, resulting in a decrease in the flocculation effect. Therefore, it is not preferable that a large amount of the aqueous solution is prepared in advance and stored in a tank or the like. In order to sufficiently achieve the original flocculation effect of the polymer flocculant, it is preferable to add a fresh aqueous solution that is used as soon as possible after the polymer flocculant has dissolved in water.

However, when the dissolving time is short, a problem arises in that the polymer flocculant remains undissolved. When being added to sludge or the like, the undissolved polymer flocculant does not immediately exert the flocculation action. Therefore, even in conventional techniques, a dissolving method with which the amount of an undissolved polymer flocculant is reduced to a minimum, and the additional arrangement of an apparatus for dissolving the undissolved polymer flocculant have also been investigated (see Patent Documents 1 to 6, for example).

Patent Document 1 discloses a technique for crushing an undissolved polymer flocculant using a tubular mesh filter and a roller that rotates in the filter and dissolving the undissolved polymer in water. Patent Documents 2 and 3 also disclose techniques for crushing an undissolved polymer flocculant and dissolving the undissolved polymer flocculant in water. Patent Document 4 discloses a technique for grinding an undissolved polymer flocculant using a colloid mill and dissolving the undissolved polymer flocculant in water. Patent Documents 5 and 6 also disclose techniques for grinding an undissolved polymer flocculant and dissolving the undissolved polymer flocculant in water. Regarding the technique for grinding an undissolved polymer flocculant, use of a fixed disk and a rotary disk has also been investigated. It is thought that, with the techniques disclosed in Patent Document 1 to 6, a polymer flocculant can be dissolved in a short period of time, but power required for grinding an undissolved polymer flocculant mechanically is by no means low. Furthermore, there is also a concern that the action of crushing a polymer flocculant mechanically will cause the breakage of the molecular structure of the polymer flocculant, resulting in deterioration of the flocculation action.

CITATION LIST

[Patent Literature]

Patent Literature 1: Japanese Patent No. 3184797

Patent Literature 2: Japanese Patent No. 5037002

Patent Literature 3: Japanese Patent No. 5521272

Patent Literature 4: Japanese Patent No. 3184729

Patent Literature 5: Japanese Patent Laid-Open No. 2001-026650

Patent Literature 6: Japanese Patent Laid-Open No. H10-176064

SUMMARY OF INVENTION

Problems to be Solved by the Invention

The present invention was achieved in order to solve the foregoing problems, which are shown as examples, and it is an object thereof to provide a polymer flocculant mixing and dissolving system and a method for mixing and dissolving a polymer flocculant that can produce a polymer flocculant solution in a short period of time using low power.

Moreover, it is another object of the present invention to provide a polymer flocculant mixing and dissolving system and a method for mixing and dissolving a polymer flocculant that can dissolve an undissolved polymer flocculant immediately without applying a mechanical action such as crushing or grinding.

Means for Solving the Problems (1) A polymer flocculant mixing and dissolving system according to the present invention comprising: a mixing tank in which a solid polymer flocculant is mixed with water as a solvent; a liquid feed unit for feeding an aqueous solution containing the mixed polymer flocculant from the mixing tank; a regenerative mixer ("regenerative turbine mixer" or "Karyu mixer") that comprises a casing arranged at an intermediate position of a channel for the aqueous solution discharged from the liquid feed unit, and a bladed wheel in which grooves are formed in a radial pattern all over an outer circumference, and is used to mix and dissolve the polymer flocculant through pressure application by rotating the bladed wheel in the casing and forming a vortex flow of the aqueous solution along an inner circumferential wall of the casing; and a pressure adjusting unit arranged at an intermediate position of a channel for the aqueous solution that has passed through the regenerative mixer, and controls pressure on a discharge side of the regenerative mixer, wherein the pressure adjusting unit has information regarding a pressure set value determined in association with a type of polymer flocculant, and performs pressure control such that the pressure on the discharge side of the regenerative mixer is applied to a pressure corresponding to the type of polymer flocculant.

Here, even in a case where a common regenerative pump ("Karyu pump") is used, when the pump is used for the purpose of dissolving the swollen undissolved polymer flocculant, the pump is used for the purpose of obtaining the functions and effects of the present invention, and therefore, it is construed that the above regenerative mixer encompasses common regenerative pumps. It should be noted that the regenerative pump ("Karyu pump") may also be referred to as a "cascade pump".

(2) The regenerative mixers may be arranged in series at least two positions in the channel for the aqueous solution discharged from the liquid feed unit, the regenerative mixers successively applying pressure to the aqueous solution at the respective positions.

(3) The polymer flocculant mixing and dissolving system may further comprise: a power detecting unit for detecting power of the regenerative mixers at the respective positions; and a power adjusting unit for controlling rotation rates of the bladed wheels of the regenerative mixers at the respective positions such that the power of the regenerative mixers at the respective positions detected by the power detecting unit is equalized.

(4) The polymer flocculant mixing and dissolving system may further comprise: a power adjusting unit that has information regarding power set values for the regenerative mixers at the respective positions, the power set values being associated with a flow rate set value of the aqueous solution fed by the liquid feed unit and being set deviation such that the power of the regenerative mixers at the respective positions is equalized, and controls the power of the regenerative mixers at the respective positions based on the flow rate of the aqueous solution fed by the liquid feed unit and the information regarding power set values.

(5) The polymer flocculant mixing and dissolving system may further comprise: a power adjusting unit that has information regarding power set values for the regenerative mixers at the respective positions, the power set values being associated with a viscosity of the aqueous solution in which the polymer flocculant has been dissolved to a target concentration and being set deviation such that the power of the regenerative mixers at the respective positions is equalized, and controls the power of the regenerative mixers at the respective positions based on a flow rate of the aqueous solution fed by the liquid feed unit and the information regarding power set values.

It should be noted that "such that the power of the regenerative mixers is equalized at each stage" encompasses a technical meaning that equalization is performed such that an imbalanced state is eliminated, and does not mean that the power is changed to the very same value. Therefore, even if there is a difference in the power (about ±10%), when equalization is performed, such a case is encompassed in "such that the power of the regenerative mixers is equalized at each stage".

(6) A method for mixing and dissolving a polymer flocculant according to the present invention comprising steps of: mixing a solid polymer flocculant with water as a solvent; feeding an aqueous solution containing the mixed polymer flocculant to a regenerative mixer; mixing and dissolving the polymer flocculant in the regenerative mixer through pressure application by forming a vortex flow of the aqueous solution along an inner circumferential wall of a casing of the regenerative mixer; and controlling pressure on a discharge side of the regenerative mixer by using a pressure adjusting unit arranged at an intermediate position of a channel for the aqueous solution that has passed through the regenerative mixer, wherein, in the step of controlling pressure, based on information regarding a pressure set value determined in association with a type of polymer flocculant, pressure control is performed such that the pressure on the discharge side of the regenerative mixer is applied to a pressure corresponding to the type of polymer flocculant.

Advantageous Effects of Invention

The present invention comprising: mixing a solid polymer flocculant with water as a solvent, feeding an aqueous solution which taken by mixing to a regenerative mixer, and mixing and dissolving the polymer flocculant in the regenerative mixer through pressure application by forming a vortex flow of the aqueous solution along an inner circumferential wall of a casing of the regenerative mixer. In this composition, it is able to dissolve an undissolved polymer flocculant immediately without applying a mechanical action such as crushing or grinding. As a result, an solution of a polymer flocculant can be produced in a short period of time using low power, and this fresh aqueous solution of the polymer flocculant can be used to perform favorable sludge disposal, water treatment, or the like.

Furthermore, with the present invention, it is not applying a mechanical action such as crushing or grinding and therefore, a concern that the molecular structure of the polymer flocculant is broken, resulting in deterioration of the polymer flocculant, and a concern that such a breakage has an influence on the sludge disposal step or the water treatment step can be advantageously reduced compared with a case where a conventional system is used.

MODES FOR CARRYING OUT THE INVENTION

Hereinafter, a polymer flocculant mixing and dissolving system according to a preferred embodiment of the present invention will be described with reference to the accompanying drawings. However, the technical scope of the present invention should not be construed as being limited in any way by the description of the embodiment below.

Figure 1:
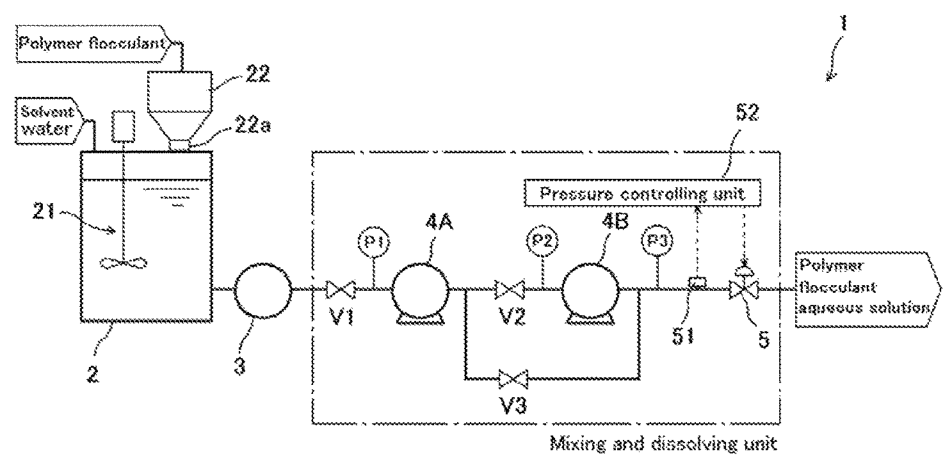
FIG. 1 shows the configuration of the polymer flocculant mixing and dissolving system according to a preferred embodiment of the present invention, FIG. 2 explains the configuration of the regenerative mixer of the above system, FIG. 3 explains regarding mixing and dissolving by the regenerative mixer of the above system, FIG. 4 explains regarding the change of power of the regenerative mixer of the above system.

FIG. 1 is a schematic diagram showing an overall configuration of a polymer flocculant mixing and dissolving system (referred to as "mixing and dissolving system" hereinafter) according to this embodiment. As shown in FIG. 1, a mixing and dissolving system 1 includes a mixing tank 2 in which a solid polymer flocculant is mixed with water as a solvent. The mixing tank 2 is a sealed or open tank in which water as a solvent can be stored. The water as a solvent is supplied into the tank through a channel such as a pipe connected to the top of the tank, for example. The mixing tank 2 may further include a stirring unit for stirring water in the tank and dispersing the polymer flocculant. In one example, a stirrer 21 that uses a driving motor to rotate a stirring blade arranged in the tank can be used as the stirring unit. Known stirring unit other than the stirrer may be used.

The mixing tank 2 can be designed as appropriate to have a capacity that corresponds to the amount of an aqueous solution to be prepared. In one example, the mixing tank 2 can be designed to have a capacity that is suitable for an operation in which the time for mixing in the tank (that is, a residence time) is set to 5 to 15 minutes, and preferably 10 minutes. The reason why the mixing time is set as described above is to secure the period of time required to allow the polymer flocculant to swell to an extent at which the polymer flocculant can be dissolved in a latter step. When the mixing time is too short, the polymer flocculant may swell insufficiently and thus the polymer flocculant cannot be dissolved sufficiently even in a latter step. On the contrary, an excessively long mixing time is contrary to the object of preparing a fresh aqueous solution. In addition, the size of the mixing tank 2 increases disadvantageously. A continuous supply method that continuously supplies water as a solvent into the tank can be used. The continuous supply method has the advantage in that the size of the mixing tank 2 can be reduced. Instead of the continuous supply method, a batch method may be used in which a certain amount of water is placed in the tank, the polymer flocculant is added thereto, and then water (aqueous solution) in an amount that was placed into the tank is removed.

The solid polymer flocculant in powder form or particle form is quantitatively added to the mixing tank 2 using a hopper 22 arranged on the top of the mixing tank 2, for example. The hopper 22 includes a main body portion formed in a cone shape or a pyramid shape such as an inverse cone or an inverse pyramid, and has a configuration in which the polymer flocculant is stored thereinside, cut out the polymer flocculant quantitatively from the bottom portion, and added to the mixing tank 2. The hopper 22 is sealed up such that the polymer flocculant does not absorb moisture while being stored. Furthermore, a moisture prevention measure such as blowing of dry gas may be taken. A discharge unit 22*a* for cutting out the polymer flocculant quantitatively from the hopper is arranged at the bottom portion of the hopper 22. In one example, a screw conveyor-type metering feeder can be used as the discharge unit 22*a*. It should be noted that the hopper 22 is a preferred example of a unit for adding the polymer flocculant quantitatively to the mixing tank 2, and another addition unit may be used or an operator may add the polymer flocculant manually.

A liquid feed pump 3 that is an example of a liquid feed unit for continuously removing the aqueous solution from the tank and feeding the aqueous solution to a downstream step is connected to the mixing tank 2. The aqueous solution to be removed from the mixing tank 2 contains the polymer flocculant that has already been dissolved, and the undissolved polymer flocculant swollen by water. Furthermore, lumps ("mamako") of the polymer flocculant may be contained therein. The viscosity of the aqueous solution increases due to the polymer flocculant being dissolved therein, and therefore, the configuration in which the liquid feed pump 3 is used to feed the aqueous solution to the downstream step is applied. Furthermore, in one example, a single-screw pump that is suitable for feeding a highly viscous liquid quantitatively can be used as the liquid feed pump 3. It will be appreciated that another type of metering pump may also be used, or a configuration in which the liquid is fed quantitatively using a combination of a flow rate adjusting valve and a pump may be applied. A liquid feed unit other than a pump may also be used.

A first regenerative mixer 4A is connected to a channel such as a pipe connected on the discharge side of the liquid feed pump 3, and a second regenerative mixer 4B is connected subsequently. That is, a configuration in which the first regenerative mixer 4A and second regenerative mixer 4B used to mix and dissolve the polymer flocculant are arranged at two positions in series is applied. Valves V (V1, V2, V3), pressure gauges P (P1, P2, P3), and the like may be provided at the intermediate positions of the channel between the liquid feed pump 3 and the first regenerative mixer 4A and at the intermediate positions of the channel between the first regenerative mixer 4A and the second regenerative mixer 4B. It should be noted that the pressure on the suction side of the first regenerative mixer may be a negative pressure, and therefore, a compound gauge can be used as the pressure gauge P1 in one example. Furthermore, a bypass channel to be used to feed a liquid to the downstream side with the second regenerative mixer 4B being bypassed may be provided for the purpose of enabling the independent operation of the first regenerative mixer 4A.

Figure 2:
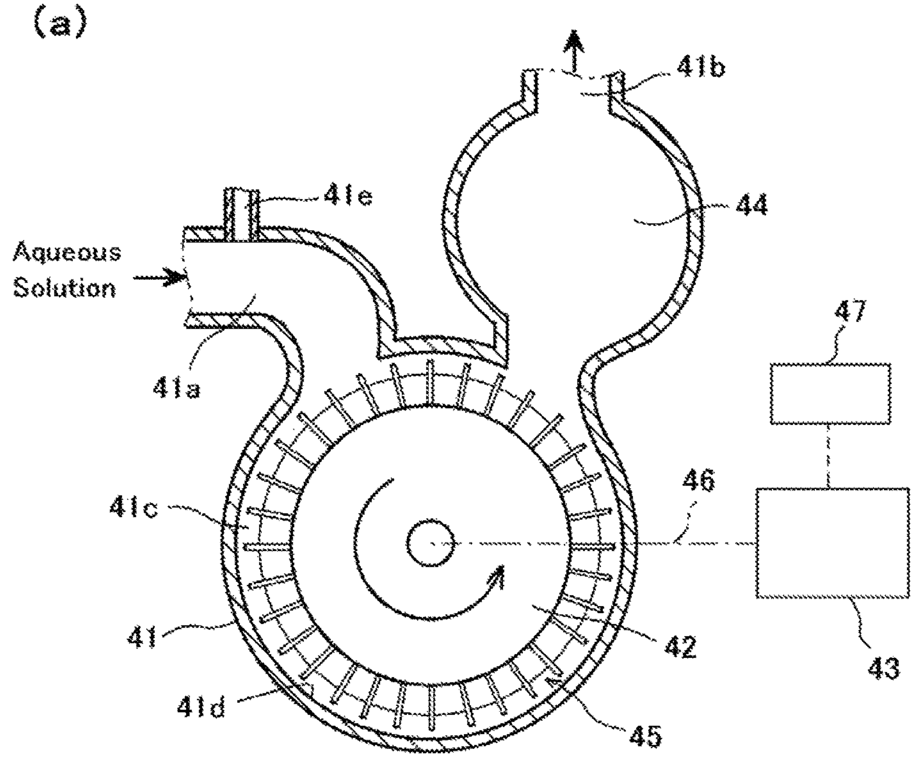
Figure 2:
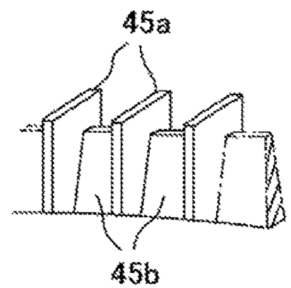

Regarding the first regenerative mixer 4A and the second regenerative mixer 4B, regenerative mixers having specifications that differ in processing capacity may be arranged, but it is preferable to use regenerative mixers having the same structure and the same processing capacity. This makes it possible to increase convenience in terms of maintenance such as a reduction in the number of spare parts. The configuration of the regenerative mixers 4A and 4B will be described more specifically. As shown in FIG. 2, the regenerative mixers 4A and 4B each include a casing 41 having a suction port 41*a* and a discharge port 41*b* for the aqueous solution, a bladed wheel 42 that corresponds to an impeller of a pump, and a driving motor 43 serving as a driving mechanism for rotating the bladed wheel 42. For the sake of convenience of illustrating the diagram, the driving motor 43 is shown by a block diagram.

The casing 41 has an internal region 41*c* that is in communication with the suction port 41*a* and the discharge port 41*b* for the aqueous solution and rotatably accommodates the bladed wheel 42. This internal region 41*c* has an inner circumferential surface 41*d* that faces the outer circumferential edge of the bladed wheel 42 in a non-contact manner with a gap there between. The aqueous solution sucked into the casing 41 through the suction port 41*a* is transferred in the internal region 41*c* of the casing with pressure being applied by the rotating bladed wheel 42, and is discharged through the discharge port 41*b*. It is preferable to arrange the suction port 41*a* and the discharge port 41*b* near the top of the casing 41 because a long distance over which pressure is applied can be secured in the casing 41. A buffer region 44 having an increased capacity is formed in the discharge port 41*b*. The aqueous solution discharged from the casing 41 forms a vortex flow, and this buffer region 44 can eliminate the vortex flow. An injection port 41*e* for injecting so-called "priming water" into the casing 41 at the time of start-up is provided in the suction port 41*a*.

The bladed wheel 42 is formed in substantially a disk shape, and is arranged in the internal region 41*c* of the casing 41 so as to be capable of rotating around a line extending from the center of the circle in an orthogonal direction (vertical direction to the sheet) as a rotation axis. A large number of grooves 45 for forming a minute vortex flow along the inner circumferential surface 41*d* of the casing 41 are formed in a radial pattern at the outer circumferential edge of the bladed wheel 42. These large numbers of grooves 45 are formed in a radial pattern all over the circumference of the outer circumferential edge of the bladed wheel 42. Specifically, as shown in a partially enlarged perspective view of FIG. 2(*b*), the shape of the grooves 45 is configured by first blade portions 45*a* formed to have faces facing in the rotation direction, and second blade portions 45*b* formed to have faces facing in a direction orthogonal to the rotation direction. The first blade portions 45*a* are formed such that their upper ends project outward farther than those of the second blade portions 45*b*. Furthermore, the second blade portions 45*b* are each formed such that the thickness increases toward the lower end from the upper end so that the cross section has a triangular shape. Therefore, the size of the grooves can be changed by changing the sizes of the first blade portions 45*a* and the second blade portions 45*b*. Although the sizes of the grooves 45 can be changed as appropriate, in a case where the grooves 45 are formed in the shape as shown in FIG. 2, the grooves 45 repeatedly form a minute vortex flow along the inner circumferential wall 41*d* of the casing when the bladed wheel 42 rotates, and thus pressure can be applied to the aqueous solution inside. In particular, providing the second blade portions 45*b* makes it possible to form regular vortex flows on both sides (left-right direction) of the bladed wheel 42, and to promote the mixing and dissolving of the polymer flocculant. However, the second blade portions 45*b* are not necessarily provided.

A rotating shaft 46 is connected to the bladed wheel 42 along the above-described rotation axis. The rotating shaft 46 passes through the casing 41 and is coupled to the driving motor 43 arranged outside, and a configuration in which the bladed wheel 42 is rotated through the driving of the driving motor 43 is applied. A portion of the casing 41 through which the rotating shaft 46 passes can be sealed using a sealing mechanism (not shown) such as mechanical sealing. The regenerative mixers 4A and 4B each further include a power adjusting unit for enabling the variable setting of the rotation rate of the bladed wheel 42. In one example, an inverter 47 can be used as the power adjusting unit. Therefore, the first regenerative mixer 4A and the second regenerative mixer 4B can operate the bladed wheels 42 at the same rotation rate or at rotation rates different from each other, and changing the rotation rate makes it possible to realize mixing and dissolving suitable for each polymer flocculant. For example, an initial set value may be set to a frequency of 60 Hz (or 50 Hz), and the frequency may be variably adjusted such that an appropriate rotation rate is obtained. The electric power (load factor) of the inverter 47 can be used as an index of the appropriate rotation rate. Alternatively, measurement results from the measurement of power (kW) of the driving motor 43 performed using a dynamometer or the like may be used as the index. Furthermore, power measured in the inverter 47 incorporated with a dynamometer may be used as the index. It will be appreciated that another power detecting unit may also be used.

The power is changed such that the workloads of the first regenerative mixer 4A and the second regenerative mixer 4B are equal, in other words, in order to improve a situation where there is an imbalance between the workloads of the first regenerative mixer 4A and the second regenerative mixer 4B. That is, pressure is applied using the regenerative mixers 4A and 4B located at two positions, and therefore, the pressure can be more easily increased to a target pressure when the operations are performed in a state in which the rotation rates are increased as much as possible. On the contrary, in the situation where there is an imbalance between the workloads, the driving motor 43 with a higher workload is likely to become overloaded. Therefore, the overloading of the driving motor 43 is prevented by improving such a situation such that the workloads thereof are equalized to each other. When the improvement of such a situation can be made to equalize the workloads, power consumption can be minimized, and thus a power-saving effect can be obtained.

In one example, the power is improved not only during a normal operation but also at timing (1) when the required amount of aqueous solution is changed depending on the processing amount in a sludge disposal step or the like, and thus the power is changed depending on the change in the flow rate of the liquid feed pump, and (2) when the power is changed in order to apply pressure suitable for the type of polymer flocculant. The procedures for changing power in these situations (1) and (2) will be described in detail later.

Referring back to FIG. 1, a pressure adjusting unit for controlling the pressure on the discharge side of the second regenerative mixer 4B to a predetermined pressure is provided in a channel such as a pipe connected on the discharge side of the second regenerative mixer 4B. In one example, a combination of a pressure adjusting valve 5 whose valve opening degree is changed to adjust a pressure, a pressure sensor 51, and a pressure controlling unit 52 that controls the degree of opening of the pressure adjusting valve 5 such that a value detected by the pressure sensor 51 becomes a predetermined pressure can be used as the pressure adjusting unit. The predetermined pressure refers to a set pressure value that is determined in advance depending on the type of polymer flocculant, for example. That is, in this embodiment, attention is focused on a characteristic in which a polymer flocculant is easily dissolved in a solvent due to the infiltration into the solvent being promoted under high pressure, and in addition, the degree of pressure varies depending on the type of polymer flocculant, and thus a configuration in which the pressure is controlled through pressure application to a pressure suitable for the dissolving of the polymer flocculant is applied. Therefore, it is preferable to possess information regarding a pressure set value that is determined in advance in association with the type of polymer flocculant or store such information in a memory or the like of a computer of the pressure controlling unit 52. The pressure set value may be determined based on the components, the molecular weight, and the like of the polymer flocculant, for example, or determined through an actual test. An operator sets the pressure set value for the pressure controlling unit 52 depending on the type of polymer flocculant, or alternatively, the pressure controlling unit 52 reads the information from the memory or the like and sets the pressure set value.

The aqueous solution (that is, polymer flocculant solution) that has passed through the pressure adjusting valve 5 may be added to sludge in the sludge disposal step as it is, or may be once passed through a buffer tank or the like and then added to sludge. Also, in the water treatment step, the aqueous solution can be added to water to be treated in the same manner. In the sludge disposal step, sludge to which the polymer flocculant solution has been added such that a predetermined chemical injection rate is achieved is supplied to a decanter-type centrifugal concentrator or centrifugal dehydrator, for example, and then solid-liquid separation such as concentration or dehydration is performed. Also, in the water treatment step, water to be treated to which the polymer flocculant solution has been added such that a predetermined chemical injection rate is achieved is supplied to a sedimentation tank, a filtration apparatus, or the like, and then solid-liquid separation is performed. However, there is no limitation on the type of solid-liquid separation apparatus, and the polymer flocculant solution prepared using the mixing and dissolving system 1 of this embodiment can be used in known solid-liquid separation apparatuses. It should be noted that, in this embodiment, the regenerative mixers 4A and 4B having a configuration shown in FIG. 2 are shown as a preferred aspect, but a common regenerative pump ("Karyu pump") may be used instead. The regenerative mixers 4A and 4B shown in FIG. 2 are regenerative turbo mixers that have a structure based on that of a regenerative pump and exert an improved mixing function. Therefore, although an inferior effect is exhibited, even a common regenerative pump can be used to dissolve an undissolved polymer flocculant in some cases. It should be noted that the regenerative pump may also be referred to as a "cascade pump".

There is no particular limitation on the type of polymer flocculant to be used in the mixing and dissolving system 1 of this embodiment. The polymer flocculant can be selected as appropriate depending on the type, composition, and the like of sludge to be treated, water to be treated, and the like. In sludge disposal, cationic polymer flocculants are mainly used, but anionic or amphoteric polymer flocculants other than the cationic polymer flocculants are used in some cases. In one example, methacrylates ester and acrylates ester can be used as the cationic polymer flocculants. More specifically, dimethylaminoethyl methacrylate and dimethylaminoethyl acrylate can be used. Other examples of the cationic polymer flocculants include cross-linking polymer flocculants and amidine-based polymer flocculants. These polymer flocculants have a molecular weight of 150 to 16,000,000. In general, the larger the molecular weight is, the higher the viscosity of the aqueous solution is. Therefore, the viscosity can also be determined based on the molecular weight.

(Functions)

Next, a method of obtaining a polymer flocculant solution by using the above-described mixing and dissolving system 1 will be described. It should be noted that, although a case where the cationic polymer flocculant is used is mainly described in the description below, other polymer flocculants exhibit the same functions and effects unless otherwise stated. When the mixing and dissolving system 1 is started, first, water as a solvent is supplied to the mixing tank 2 at a predetermined flow rate, and the polymer flocculant is added thereto at a predetermined flow rate so as to form an aqueous solution of a predetermined concentration. In one example, the concentration can be set to 0.1 to 0.3 mass %, and preferably 0.2 mass %. Meanwhile, the liquid feed pump 3, the first regenerative mixer 4A, and the second regenerative mixer 4B are driven, and the set value of pressure controlled by the pressure controlling unit 52 is determined/changed. Here, in one example, the pressure set value is set to 0.3 MPa.

The polymer flocculant that has been mixed with water is dissolved in water in the mixing tank 2, but a portion thereof remains undissolved. However, since approximately 10 minutes has been secured for mixing of the polymer flocculant with water in the mixing tank 2, the polymer flocculant enters a swollen state by water. Water (aqueous solution) having an increased viscosity due to the polymer flocculant being dissolved is fed to the first regenerative mixer 4A by the liquid feed pump 3, in a state in which the undissolved polymer flocculant is contained therein. The flow rate of the liquid feed pump 3 can be set to 8 to 25 L/min, for example.

Figure 3:
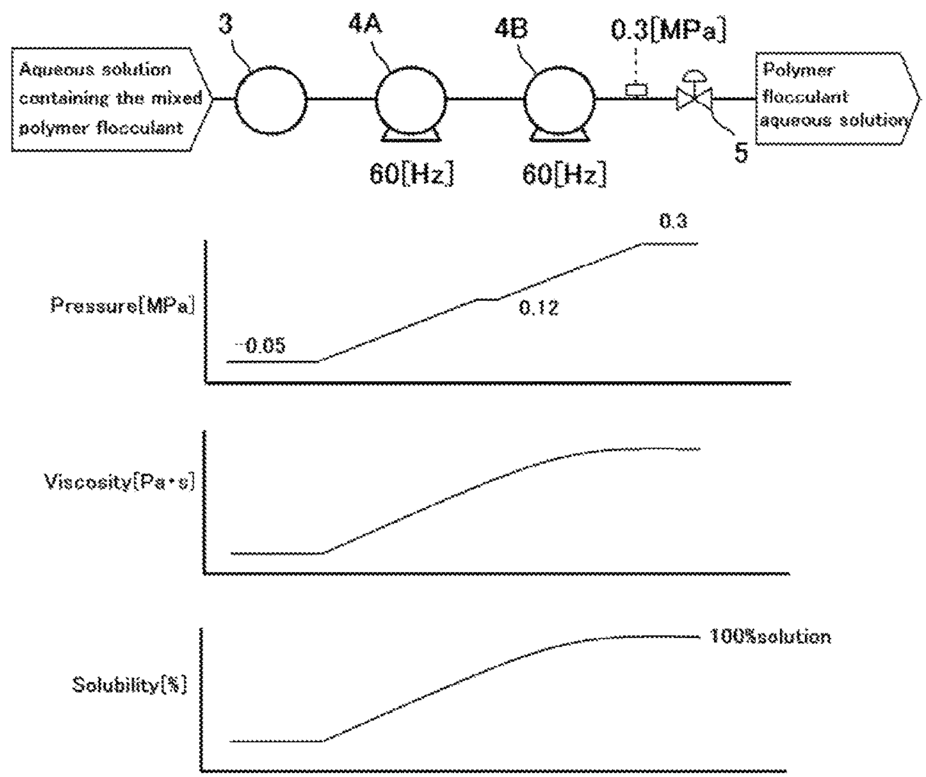

On the other hand, as shown in FIG. 3, in the first regenerative mixer 4A and the second regenerative mixer 4B, the frequency is set to 60 Hz (or 50 Hz) using the inverter 47, for example, and the driving motor 43 is driven. When an appropriate value for the frequency is determined in advance according to the type of polymer flocculant, the frequency is set to this appropriate value. The bladed wheel 42 is rotated within a range of 800 to 3500 $min^{-1}$, for example. The liquid feed pump 3A feed the aqueous solution to the first regenerative mixer 4A, the aqueous solution is repeatedly formed minute vortex flow along the inner circumferential surface 41*d* of the casing 41 by the rotating bladed wheel 42, and thus pressure is increased. In one example, the pressure applied to the aqueous solution increases from the suction port, near which the pressure is −0.05 MPa, toward the discharge port, near which the pressure is 0.12 MPa. In this manner, the pressure is increased with a minute vortex flow being repeatedly formed by the bladed wheel 42, and thus the polymer flocculant is sufficiently mixed and is dissolved in water. At this time, the viscosity of the aqueous solution increases as the polymer flocculant is dissolved. As described above, the bladed wheel 42 rotates in a state of not coming into contact with other portions, and therefore, substantially no action of crushing the polymer flocculant mechanically is exhibited, and substantially no shearing stress is generated. The vortex flow that is repeatedly formed through the minute grooves 45 formed in a radial pattern, and its pressure application action promote the mixing and dissolving of the polymer flocculant.

The aqueous solution that has passed through the first regenerative mixer 4A feed the subsequent second regenerative mixer 4B, the aqueous solution is repeatedly formed minute vortex flow along the inner circumferential surface 41*d* of the casing 41 by the rotating bladed wheel 42, and thus pressure is increased. In one example, the pressure applied to the aqueous solution increases from the suction port, near which the pressure is 0.12 MPa, toward the discharge port, near which the pressure is 0.3 MPa, which is a target pressure. That is, the regenerative mixers 4A and 4B configured to be located at two positions in series are used to successively increase the pressure to a pressure suitable for the dissolving of the polymer flocculant. Also, in the second regenerative mixer 4B, the vortex flow that is repeatedly formed through the minute grooves 45 formed in a radial pattern, and its pressure application action promote the mixing and dissolving of the polymer flocculant in the same manner as in the first regenerative mixer 4A. Furthermore, the pressure is increased to a pressure suitable for the dissolving of the polymer flocculant, thus making it possible to dissolve the polymer flocculant completely. At this time, since the polymer flocculant has dissolved completely, the increase in viscosity of a second aqueous solution comes to an end.

Figure 4:
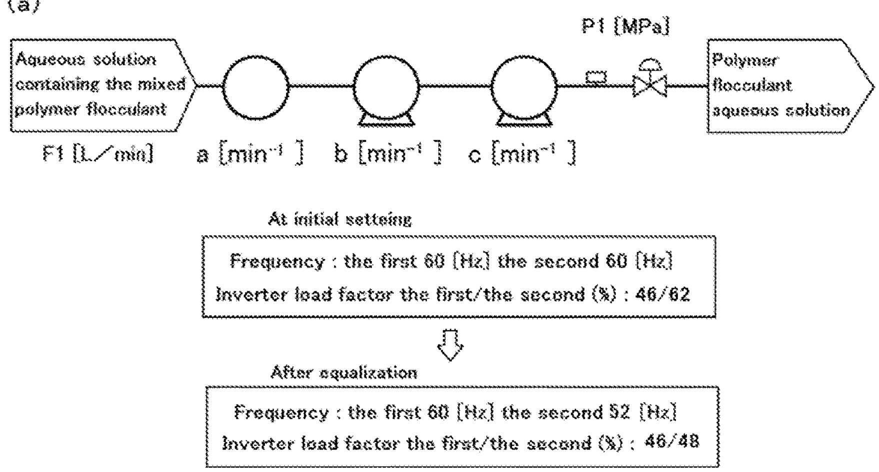
Figure 4:
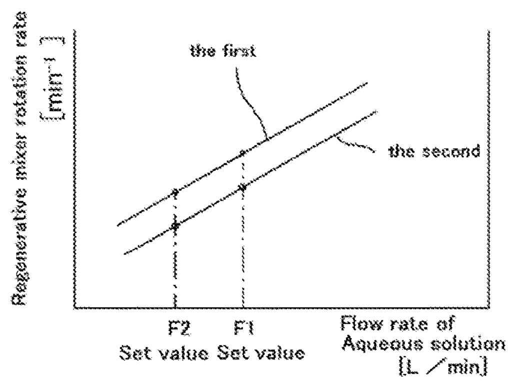
Figure 4:
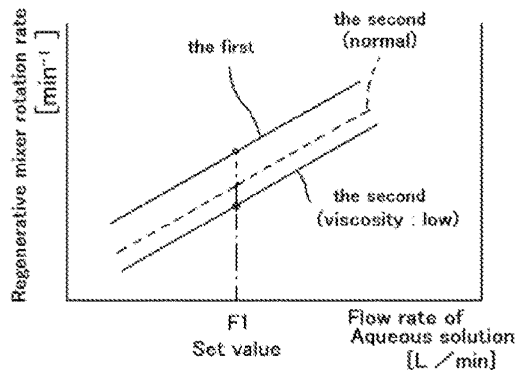

Here, the above-described procedures for changing power will be described with reference to FIG. 4(*a*). First, (1) the case where the required amount of aqueous solution is changed depending on the processing amount in a sludge disposal step or the water treatment step, and thus the power is changed depending on the change in the flow rate of the liquid feed pump 3 will be described. When the required flow rate of the aqueous solution is taken as F1 (L/min), the rotation rate a ($min^{-1}$) of the liquid feed pump 3 is determined in accordance with the required flow rate F1 (L/min). Furthermore, the rotation rate b ($min^{-1}$) of the first regenerative mixer 4A and the rotation rate c ($min^{-1}$) of the second regenerative mixer 4B are determined in accordance with rotation rate a ($min^{-1}$) of the liquid feed pump 3. When the required flow rate is changed to F1 (L/min), an indicated value of the pressure sensor 51 changes, but the pressure is automatically controlled to an appropriate pressure (pressure set value) by the pressure adjusting valve 5. Furthermore, the rotation rate b ($min^{-1}$) of the first regenerative mixer 4A and the rotation rate c ($min^{-1}$) of the second regenerative mixer 4B are set deviation such that appropriate power (that is, power consumption) for the first regenerative mixer 4A and the second regenerative mixer 4B is maintained. Specifically, the load factors of the inverters 47 for the first regenerative mixer 4A and the second regenerative mixer 4B are detected, and then the frequencies are set deviation such that the load factors of both inverters are equalized. That is, the rotation rates are controlled such that the power is equalized. FIG. 4(*a*) shows the results of the actual test. There was an imbalance between the load factors (%) of the inverters, which were 46/62, and therefore, since the frequency of the second regenerative mixer 4B changing to 52 Hz, thus substantially equalize the load factors (%) of the inverters to 46/48. Alternatively, the power (kW) of the driving motors 43 for the first regenerative mixer 4A and the second regenerative mixer 4B is measured using a dynamometer or the like, and then the frequencies are set deviation such that the power of both driving motors are equalized. Controlling the power in this manner makes it possible to dissolve the polymer flocculant using low power, which results in a further reduction in power consumption. Such power control can be achieved using a configuration in which a control unit constituted by a computer automatically controls the power. Alternatively, an operator may control the power. After the operation is shifted to a normal operation, monitoring may be performed as appropriate, and the power may be adjusted such that the workloads of the first regenerative mixer 4A and the second regenerative mixer 4B are equal.

Instead of the above-described feedback control, a feedforward control can also be performed. In one example, as schematically shown in FIG. 4(*b*), for example, set values for the rotation rate b (min-1) of the first regenerative mixer 4A and the rotation rate c (min-1) of the second regenerative mixer 4B that are set deviation such that, for example, the power is equalized are determined in association with the required flow rate of the aqueous solution, and control is performed based on this information. Specifically, when the flow rate is changed from a flow rate F1 to a flow rate F2, a feedforward control that changes the rotation rates to the rotation rate b ($min^{-1}$) of the first regenerative mixer 4A and the rotation rate c ($min^{-1}$) of the second regenerative mixer 4B in accordance with the flow rate F2 is performed. It is possible to determine how much deviation is set between the rotation rate b ($min^{-1}$) of the first regenerative mixer 4A and the rotation rate c ($min^{-1}$) of the second regenerative mixer 4B through an actual test or the like, for example. In one example, the above-described feedback control is performed to obtain, as information regarding power set values, data regarding a deviation between the rotation rates at which the power of the first regenerative mixer 4A and the power of the second regenerative mixer 4B are equalized, with respect to various flow rates, and the determination can be performed based on this data.

Next, (2) the case where the power is changed in order to apply pressure suitable for the type of polymer flocculant will be described. As described above, the viscosity of the aqueous solution of the polymer flocculant varies widely depending on the components or the molecular weight of the polymer flocculant. Furthermore, in this embodiment, the regenerative mixers 4A and 4B are arranged in series to successively promote dissolving, and therefore, the viscosity of the aqueous solution when passing through the former first regenerative mixer 4A and the viscosity of the aqueous solution when passing through the latter second regenerative mixer 4B are different. Therefore, an imbalance between the workload of the first regenerative mixer 4A and that of the second regenerative mixer 4B is likely to occur. In particular, when the viscosity of the aqueous solution is relatively low, an excessive load is applied to the latter second regenerative mixer 4B compared with the former first regenerative mixer 4A in many cases. In a case where cross-linking polymer flocculants, which are poorly soluble, out of polymer flocculants having a relatively low viscosity are used, such a tendency is particularly strong. Therefore, the polymer flocculants are classified, for example, based on the viscosities of the aqueous solutions thereof, and when, for example, a polymer flocculant is dissolved in pure water to 0.2 mass % and the viscosity of the resulting solution is lower than 100 to 300 mPa·s (measured using a B-type viscometer), an operation is performed with the rotation rate c ($min^{-1}$) of the second regenerative mixer 4B being reduced compared with the rotation rate b ($min^{-1}$) of the second regenerative mixer 4A. In one example, the frequency of the first regenerative mixer 4A is set to 60 Hz, and the frequency of the second regenerative mixer 4B is set to 50 Hz. That is, the rotation rates are set deviation such that the power is equalized. Changing the power in this manner makes it possible to prevent overloading of the driving motor 43 of the second regenerative mixer 4B. Thus, the polymer flocculant can be dissolved using low power, which results in a further reduction in power consumption.

More conveniently, as schematically shown in FIG. 4(*c*), a relationship between the required flow rate (L/min) of the aqueous solution and the set values of the rotation rates ($min^{-1}$) (or frequencies (Hz)) of the regenerative mixers 4A and 4B is determined in association with the viscosity of the polymer flocculant, and, based on this information, the rotation rate b ($min^{-1}$) of the first regenerative mixer 4A and the rotation rate c ($min^{-1}$) of the second regenerative mixer 4B can be determined appropriately.

The mixing and dissolving system 1 of the above-described embodiment has a configuration in which the aqueous solution containing an undissolved polymer flocculant that remains undissolved in the mixing tank 2 is passed through the first regenerative mixer 4A and the second regenerative mixer 4B arranged in series, and the pressure adjustment is performed such that the pressure on the discharge side of the latter second regenerative mixer 4B is suitable for the dissolving of the polymer flocculant. Furthermore, since the regenerative mixers 4A and 4B each include a bladed wheel 42 in which the grooves 45 are formed in a radial pattern all over the outer circumference, a minute vortex flow is repeatedly formed along the inner circumferential surface 41*d* of the casing 41 by the rotating bladed wheel 42, thus making it possible to increase the pressure applied to the aqueous solution to high pressure. As a result, the mixing and dissolving of the polymer flocculant can be promoted, and the undissolved polymer flocculant swollen by water can be dissolved immediately and completely. Furthermore, even when lumps ("mamako") of the polymer flocculant are formed during mixing, the polymer flocculant can be dissolved completely.

With such a mixing and dissolving system 1, an aqueous solution (solution) of a polymer flocculant can be produced in a short period of time using low power, and this fresh aqueous solution of the polymer flocculant can be used to perform favorable sludge disposal, water treatment, or the like. Therefore, compared with a conventional dissolving method using a large-sized storage tank and a stirrer, space required for the overall system can be saved, and the operation load on the system can be reduced. Furthermore, since the polymer flocculant can be dissolved in a short period of time, operation of dissolving the polymer flocculant in a planned manner becomes unnecessary. Three or more regenerative mixers may be used.

Furthermore, with the mixing and dissolving system 1 of this embodiment, the bladed wheel 42 rotates in a state of not coming into contact with other portions, and therefore, substantially no action of crushing the polymer flocculant mechanically is exhibited, and substantially no shearing stress is generated. As a result, a concern that the molecular structure of the polymer flocculant is broken, resulting in deterioration of the polymer flocculant, and a concern that such a breakage has an influence on the sludge disposal step or the water treatment step can be advantageously reduced compared with a case where a conventional system is used.

DESCRIPTION OF REFERENCE NUMERALS

1 polymer flocculant mixing and dissolving system
2 mixing tank
3 liquid feed pump
4A first regenerative mixer
4B second regenerative mixer
45 grooves
5 pressure adjusting valve
51 pressure sensor
52 pressure controlling unit

What is claimed is:

1. A polymer flocculant mixing and dissolving system comprising:

a mixing tank in which a polymer flocculant in a solid state is mixed with water as a solvent;

a liquid feed unit for feeding an aqueous solution containing the mixed polymer flocculant from the mixing tank;

at least one regenerative mixer that comprises a casing arranged at an intermediate position of a channel for the aqueous solution discharged from the liquid feed unit, and a bladed wheel in which grooves are formed in a radial pattern on an outer circumference, and is used to mix and dissolve the polymer flocculant through pressure application by rotating the bladed wheel in the casing and forming a vortex flow of the aqueous solution along an inner circumferential wall of the casing; and a pressure adjusting unit arranged at an intermediate position of a channel for the aqueous solution that has passed through the regenerative mixer, and controls pressure on a discharge side of the regenerative mixer, wherein the pressure adjusting unit has information regarding a pressure set value determined in association with a type of the polymer flocculant, and performs pressure control such that the pressure on the discharge side of the regenerative mixer is applied to a pressure corresponding to the type of the polymer flocculant.

2. The polymer flocculant mixing and dissolving system according to claim 1, further comprising:

a plurality of regenerative mixers arranged, in series, in at least two positions in the channel for the aqueous solution discharged from the liquid feed unit, the regenerative mixers successively applying pressure to the aqueous solution at the respective positions.

3. The polymer flocculant mixing and dissolving system according to claim 2, further comprising:

a power detecting unit for detecting power of the regenerative mixers at the respective positions; and a power adjusting unit for controlling rotation rates of bladed wheels of the regenerative mixers at the respective positions such that the power of the regenerative mixers at the respective positions detected by the power detecting unit is equalized.

4. The polymer flocculant mixing and dissolving system according to claim 2, further comprising: a power adjusting unit that has information regarding power set values for the regenerative mixers at the respective positions, the power set values, in which deviations of rotation rates of bladed wheels of the regenerative mixers are set such that the power of the regenerative mixers at the respective positions is equalized, being associated with a flow rate set value of the aqueous solution fed by the liquid feed unit, and controls the power of the regenerative mixers at the respective positions based on the flow rate of the aqueous solution fed by the liquid feed unit and the information regarding power set values.

5. The polymer flocculant mixing and dissolving system according to claim 2, further comprising: a power adjusting unit that has information regarding power set values for the regenerative mixers at the respective positions, the power set values, in which deviations of rotation rates of bladed wheels of the regenerative mixers are set such that the power of the regenerative mixers at the respective positions is equalized, being associated with a viscosity of the aqueous solution in which the polymer flocculant has been dissolved to a target concentration, and controls the power of the regenerative mixers at the respective positions based on a flow rate of the aqueous solution fed by the liquid feed unit and the information regarding power set values.

6. A method for mixing and dissolving a polymer flocculant comprising steps of:

mixing a polymer flocculant in a solid state with water as a solvent;

feeding an aqueous solution containing the mixed polymer flocculant to at least one regenerative mixer;

mixing and dissolving the polymer flocculant in the regenerative mixer through pressure application by forming a vortex flow of the aqueous solution along an inner circumferential wall of a casing of the regenerative mixer; and controlling pressure on a discharge side of the regenerative mixer by using a pressure adjusting unit arranged at an intermediate position of a channel for the aqueous solution that has passed through the regenerative mixer, wherein, in the step of controlling pressure, based on information regarding a pressure set value determined in association with a type of the polymer flocculant, pressure control is performed such that the pressure on the discharge side of the regenerative mixer is applied to a pressure corresponding to the type of the polymer flocculant.

* * * * *